(12) United States Patent
Nakayama

(10) Patent No.: US 7,693,083 B2
(45) Date of Patent: Apr. 6, 2010

(54) AUDIO NETWORK SYSTEM

(75) Inventor: Kei Nakayama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 259 days.

(21) Appl. No.: 11/729,760

(22) Filed: Mar. 28, 2007

(65) Prior Publication Data

US 2007/0230462 A1 Oct. 4, 2007

(30) Foreign Application Priority Data

Mar. 29, 2006 (JP) ............................. 2006-089867

(51) Int. Cl.
*H04L 12/28* (2006.01)
*H04L 12/56* (2006.01)
*H04L 12/42* (2006.01)

(52) U.S. Cl. ..................... 370/249; 370/403; 370/452

(58) Field of Classification Search ................. 370/389, 370/403, 429, 452, 249

See application file for complete search history.

(56) References Cited

U.S. PATENT DOCUMENTS

| | | | |
|---|---|---|---|
| 5,257,259 A | 10/1993 | Tsurumi et al. | |
| 5,487,067 A | 1/1996 | Matsushige et al. | |
| 6,504,823 B1 * | 1/2003 | Nakajima et al. | 370/241 |
| 6,963,944 B1 | 11/2005 | Rettig et al. | |
| 2002/0184038 A1 * | 12/2002 | Costello et al. | 704/500 |
| 2003/0016700 A1 * | 1/2003 | Li | 370/477 |
| 2004/0233852 A1 * | 11/2004 | Ochi et al. | 370/242 |
| 2005/0143843 A1 * | 6/2005 | Bogin et al. | 700/20 |
| 2005/0286859 A1 * | 12/2005 | Komi et al. | 386/46 |
| 2006/0087966 A1 * | 4/2006 | Sawada et al. | 370/222 |

FOREIGN PATENT DOCUMENTS

| | | |
|---|---|---|
| DE | 199 06 867 C1 | 7/2000 |
| JP | 05-347628 A | 12/1993 |
| JP | 2002-247059 A | 8/2002 |

(Continued)

OTHER PUBLICATIONS

The CobraNet, URL—http://www.balcom.co.jp/cobranet.htm.

(Continued)

*Primary Examiner*—Alpus H Hsu
*Assistant Examiner*—Saad Hassan
(74) *Attorney, Agent, or Firm*—Morrison & Foerster LLP

(57) ABSTRACT

An audio network system allows any two nodes among a plurality of nodes to transmit and receive audio data to and from each other. The plurality of the nodes are connected in loop so as to allow transmission of the audio data in loop manner through the plurality of the nodes, and the transmission of the audio data is performed in one direction from an upstream node to a downstream node. One of the plurality of the nodes is set as a master node and the other nodes are set as slave nodes. The master node periodically transmits a packet of frame data containing the audio data every sampling period, such that the packet transmitted from the master node circulates through the plurality of the nodes to return to the master node within one or more sampling period. The packet has a specific data length and includes an audio data storage region divided into a plurality of blocks corresponding to a plurality of channels, such that each of the blocks stores audio data of the corresponding channel.

10 Claims, 9 Drawing Sheets

FOREIGN PATENT DOCUMENTS

| | | |
|---|---|---|
| WO | WO-99/53651 A1 | 10/1999 |
| WO | WO-02/15460 A2 | 2/2002 |
| WO | WO-02/15460 A3 | 2/2002 |

OTHER PUBLICATIONS

Digital Audio Interconnection, Oxford Technologies, URL:—http://www.sonyoxford.co.uk/pub/supermac/.

EtherSound: ethernetworking professional audio, URL:—http://ethersound.com/news/getnews.php?enews-key=101.

Notification of Reasons for Refusal mailed Mar. 19, 2009, for JP Patent Application No. 2007-089495, with English Translation, five pages.

European Search Report mailed Jun. 26, 2009, for EP Application No. 07104973.8, eight pages.

* cited by examiner

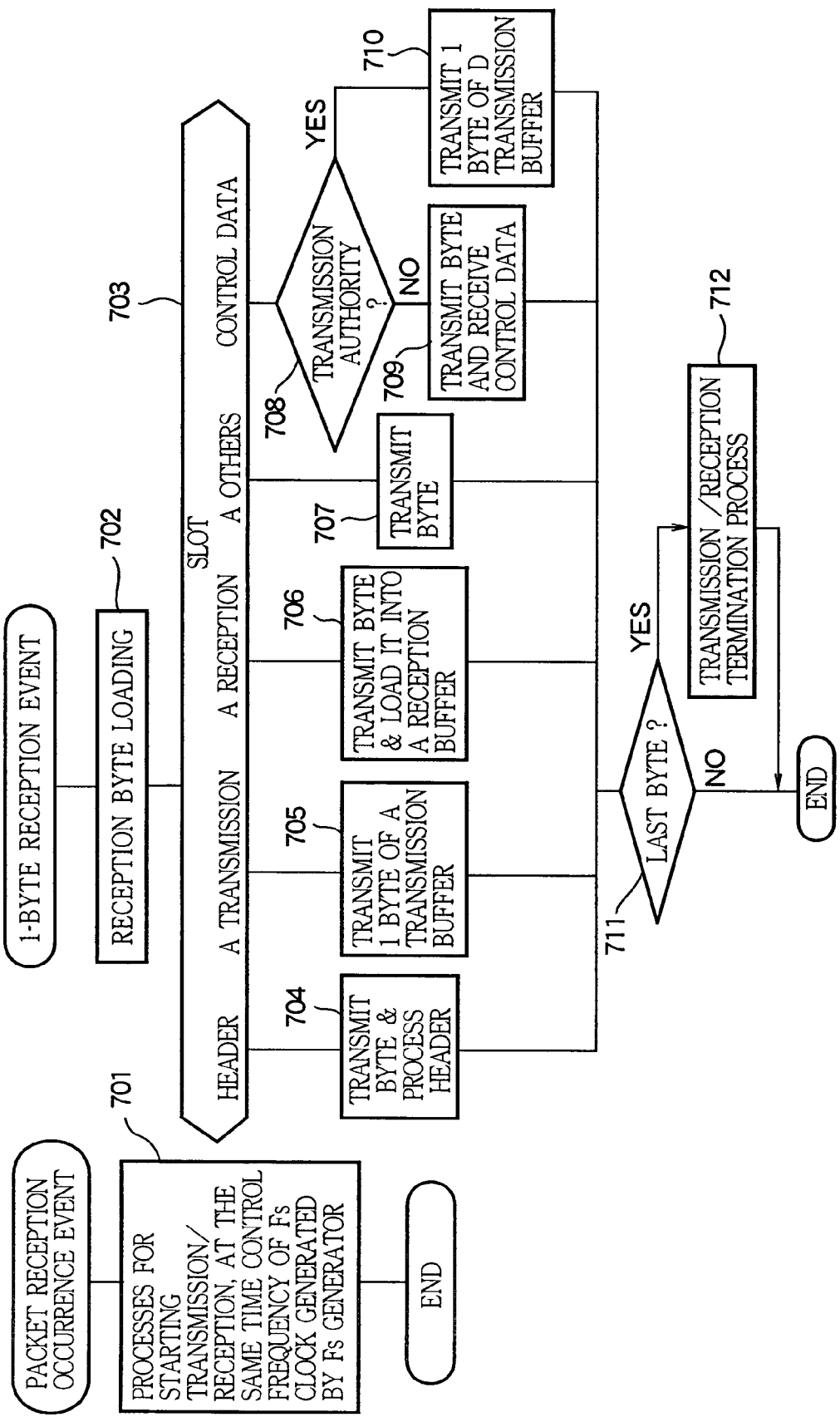

FIG.8a

PACKET RECEPTION OCCURRENCE EVENT → PROCESSES FOR STARTING RECEPTION (801) → END

FIG.8b

1-BYTE RECEPTION EVENT → RECEPTION BYTE LOADING (802) → SLOT (803)

- HEADER → SAVE BYTE & PROCESS HEADER (804)
- A TRANSMISSION → SAVE 1 BYTE OF A TRANSMISSION BUFFER (805)
- A RECEPTION → SAVE BYTE & LOAD IT INTO A RECEPTION BUFFER (806)
- A OTHERS → SAVE BYTE (807)
- CONTROL DATA → TRANSMISSION AUTHORITY? (808)
  - NO → SAVE BYTE AND RECEIVE CONTROL DATA (809)
  - YES → SAVE 1 BYTE OF D TRANSMISSION BUFFER (810)

→ LAST BYTE? (811)
- NO → END
- YES → RECEPTION TERMINATION PROCESS (812)

FIG.8c

QUEUE BUFFER A (821) ← EXTRACT (825) / SAVE (826) (824) — QUEUE BUFFER B (822) ... QUEUE BUFFER H (828)

AUDIO NETWORK SYSTEM

BACKGROUND OF THE INVENTION

1. Technical Field of the Invention

The present invention relates to an audio network system that connects a variety of audio devices.

2. Description of the Related Art

Conventional technologies for audio signal communication in an audio network system used for PA such as plays and concerts, music production, and private broadcasting include CobraNet™ described in Non-Patent Reference 1, Super-MAC™ described in Non-Patent Reference 2, and EtherSound™ described in Non-Patent Reference 3.

CobraNet is a professional audio network system developed by Peak Audio, Inc (USA). CobraNet provides a technology using the standard Ethernet™ protocol of IEEE802.3u in which uncompressed audio signals and control signals of multiple channels are transmitted through the Ethernet. This technology can transmit sampling data of a sample rate of 48 kHz and 16, 20, and 24 bits and can handle audio signals and control signals in two directions, each having up to 64 channels (i.e., up to 128 channels in two directions). SuperMAC or EtherSound is the same technology for transmitting audio signals over the Ethernet.

Audio devices having a variety of functions such as analog input, analog output, digital input, digital output, mixing, effecting, recording/reproducing, remote control, and a combination of any two of these functions can be optionally connected to an audio network that uses the above technologies.

[Non-Patent Reference 1] www.balcom.co.jp/cobranet.htm

[Non-Patent Reference 2] www.sonyoxford.co.uk/pub/supermac/

[Non-Patent Reference 3] www.ethersound.com/news/getnews.php?enews$_{13}$key=101

In any conventional audio network, audio transmission is performed according to the Ethernet standard as described above. In the Ethernet standard, the maximum packet size is limited to 1526 bytes.

In the conventional technologies, not only packets of audio data but also packets of control data such as a command, a reply to the command, and level data for meter display can flow on the network. However, when a plurality of packets of the same or different types is permitted to flow on the network, the band used for transmission of audio data is reduced accordingly. Since packets other than audio data also flow on the network, the packets may disrupt transmission of audio data. This is serious in the Ethernet that employs the CSMA/CD method.

In addition, since samples corresponding to a plurality of sampling periods are transmitted by incorporating them into one packet, it takes time to packetize samples into a packet and to reconstruct a packet into samples and circuitry for the packetization and reconstruction is complicated.

SUMMARY OF THE INVENTION

It is an object of the present invention to provide an audio network system that can stably transmit audio data and can simplify circuitry for data transmission and reception in each node.

In accordance with the present invention, the above object can be accomplished by the provision of an audio network system that comprises a plurality of nodes and that allows any two nodes among the plurality of the nodes to transmit and receive audio data to and from each other. The plurality of the nodes are connected in loop so as to allow transmission of the audio data in loop manner through the plurality of the nodes, and the transmission of the audio data is performed in one direction from an upstream node to a downstream node in the loop. One of the plurality of the nodes is set as a master node and the other nodes are set as slave nodes. The master node periodically transmits a packet of frame data containing the audio data every sampling period, such that the packet transmitted from the master node in each sampling period circulates through the plurality of the nodes to return to the master node within one or more sampling period. The packet has a specific data length and includes an audio data storage region divided into a plurality of blocks corresponding to a plurality of channels, such that each of the blocks stores audio data of the corresponding channel. Each of the plurality of the nodes is set with either of a transmission channel which indicates one of the blocks in the packet, or a reception channel which indicates one of the blocks in the packet. Each of the slave nodes receives, every sampling period, the packet from an upstream node a block by block basis beginning with a head of the packet, the slave node being operative if a received block of the packet corresponds to a transmission channel set to the slave node for overwriting the received block with audio data that is to be transmitted from the slave node, otherwise the slave node being operative if the received block of the packet corresponds to a reception channel set to the slave node for acquiring audio data from the received block that is to be received by the slave node, and then the slave node starting transmission of the packet to a downstream node after a specific time has passed from the time when the slave node starts reception of the head of the packet. The master node receives, every sampling period, a packet that has returned from a most downstream node a block by block basis beginning with a head of the packet, and constructs each block of a next packet or a packet after the next packet to be transmitted in a next sampling period based on the received packet, the master node being operative if the block of the packet corresponds to a transmission channel set to the master node for overwriting the block with audio data that is to be transmitted from the master node, otherwise the master node being operative if the block of the packet corresponds to a reception channel set to the master node for acquiring audio data from the block that is to be received by the master, and the master node starting transmission of the constructed packet to a downstream node when the next sampling period is initiated. The constructed packet contains audio data same as the audio data contained in the packet based on which the packet is constructed by the master node. One transmission channel is set to only one node in the audio network system so that the audio data written into a block by the one node is not overwritten by another node during the course of circulating the audio data in the audio network system, and any node in the audio network system can receive the audio data.

Although one packet is transmitted in loop manner within one to several sampling periods, a predetermined number of packets may also be transmitted in loop manner within one to several sampling periods without departing from the scope of the present invention.

One or the predetermined number of packets (preferably, at least one of the predetermined number of the packets) includes a control data storage region in addition to the audio data storage region so that the control data storage region of the packet is used to allow any two of the plurality of the nodes to transmit and receive the control data to and from each other.

Although the size and structure of the packet is variable, it is preferable that the packet has a data size and a data structure in accordance with Ethernet standard, and a transmitter, a receiver, and a transmission cable defined by Ethernet standard can be used for the transmission of the packet.

In one form, the plurality of the nodes are connected to allow the loop transmission of the packets, such that the plurality of the nodes are connected in cascade by one line for transmission of the packets in one way, and the plurality of the nodes are connected in cascade by another line for transmission of the packets in the other way.

In another form, the plurality of the nodes are connected to allow the loop transmission of the packets, such that the plurality of the nodes are connected in cascade from a first node to a last node for transmission of packets in one direction, and the last node is connected to the first node for returning the packets to the first node.

According to the present invention, a predetermined number of packets (for example, one packet) circulate on the network at any time in each sampling period. This allows very stable communication. For example, in the case where one packet circulates every sampling period, each node capable of receiving and transmitting the packet can transmit one sample of audio data for output on a sample by sample basis in each sampling period, or can receive one sample of audio data for reception on a sample by sample basis in each sampling period. This makes it easy to reproduce sampling clocks and simplifies the circuitry for packetization. In addition, a packet transmitted by the master node is carried in loop manner while maintaining its data structure, and each slave node only needs to overwrite a region of one channel assigned to the slave node with audio data or to extract audio data from a region of another channel set to the slave node. This significantly simplifies circuitry for outputting or inputting audio data of a packet in each slave node. Using packets of the Ethernet standard makes it possible to use a transmitter, a receiver, and a transmission cable compatible to the Ethernet, thereby making it possible to use easily obtainable, inexpensive hardware.

BRIEF DESCRIPTION OF THE DRAWINGS

FIGS. 7a and 7b are flow charts illustrating hardware processes in a slave node.

FIGS. 8a-8c are flow charts and buffer structures illustrating hardware processes in a master node.

DETAILED DESCRIPTION OF THE INVENTION

Embodiments of the present invention will now be described with reference to the accompanying drawings.

Figure 1A:
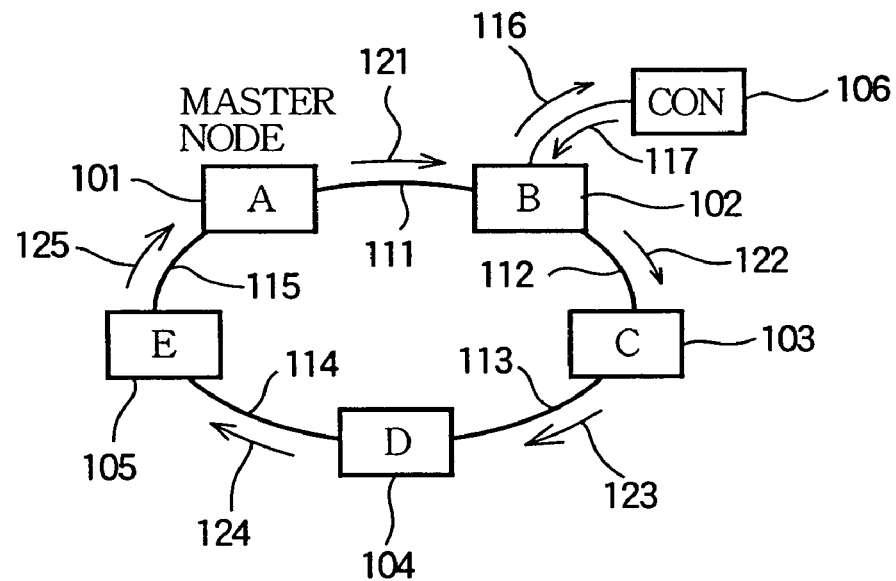
FIGS. 1a and 1b illustrate example connection of nodes and example transmission between the nodes when an audio network system according to the present invention is applied.
Figure 1B:
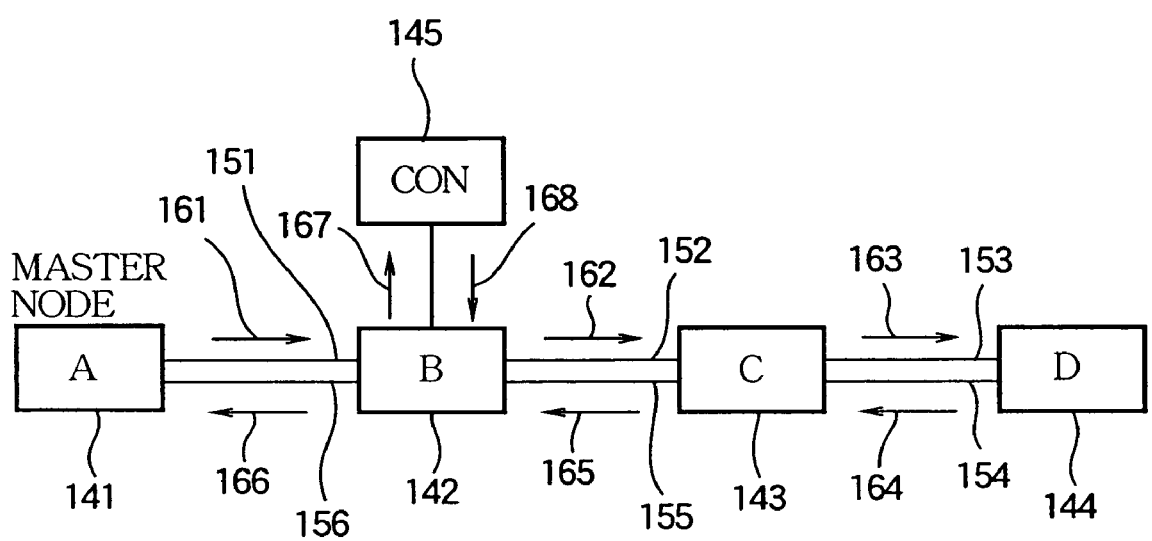

FIGS. 1a and 1b illustrate example connection of nodes and example transmission between the nodes when an audio network system according to the present invention is applied.

FIG. 1a illustrates an example ring connection of a master node A101 and slave nodes B102, C103, D104, and E105. Reference numerals "111" to "115" denote physical connection lines connected between the nodes. In this network system, only one of the connected nodes is a master node. Here, the node A101 is a master and the other nodes are slaves. Arrows "121" to "125" each denote the direction in which each bit data of a packet is transmitted.

The master node A101 transmits packets regularly, one packet every sampling period which is the period of an audio signal sampling clock in the network system. Specifically, in one sampling period, each of the nodes 101 to 105 receives bit data of one packet from an upstream node and outputs bit data of the packet to a downstream node. The master node A101 performs synchronization of the sampling period. Specifically, at the start time of one sampling period, the master node A101 starts transmitting bit data of one packet to the downstream node B102. After completing the transmission of the packet, the master node A101 waits until the sampling period is terminated. At the start time of a next sampling period, the master node A101 starts transmitting bit data of a next packet to the downstream node B102.

Packets in the network system of this embodiment are identical to packets used in the conventional Ethernet standard. However, in the conventional Ethernet, transmission is performed on a packet basis and data of a packet transmitted between nodes is not rewritten until the transmission between the nodes is terminated. On the other hand, in this embodiment, data of a packet is rewritten while the packet transmitted from the master node passes through the slave nodes in a loop until it returns to the master node, which will be described in more detail. In this embodiment, a container to transmit audio data every sampling period is referred to as a "packet". Without being limited to packets of the Ethernet standard, this invention can use packets in any other format.

Although a data unit handled in Layer 3 is referred to a "packet" and a data unit handled in Layer 2 is referred to as a "frame" in the OSI basic reference model, a container for transmitting audio data every sampling period is referred to as a "packet" and an actual data sequence for realizing the packet is referred to as a "frame" in this embodiment as described above. Accordingly, the terms "packet" and "frame" refer to the same in this embodiment.

One packet includes a region which contains audio data and control data of a plurality of channels such as a command, a reply to the command, and level data for meter display. For each node, one of the plurality of channels for transmission from the node (transmission channel) is set in the node and/or another channel for reception by the node (reception channel) is set in the node. Thus, when bit data of one packet passes through each node such that the node receives the bit data from an upstream node and outputs it to a downstream node in one sampling period, the node overwrites bit data in the region of a transmission channel for the node in the packet with a sample of audio data to be transmitted from the node and loads bit data in the region of a reception channel for the node in the packet since the bit data in the region of the reception channel is audio data to be received by the node. While bit data of one packet passes through each node, the node performs such data writing to the transmission channel and such data loading from the reception channel. Thereafter, the node transmits the bit data of the packet to an immediately downstream node. The same processes are performed in the master node A101. Specifically, the master node A101 receives a packet transmitted from a most downstream node E105 and overwrites a transmission channel assigned to the master node A101 in the packet with a sample of audio data to be transmitted from the master node A101 and loads audio data to be received by the master node A101 through a reception channel assigned to the master node A101 in the packet. The resulting packet data of this process is packet data to be transmitted in a next sampling period.

As a detailed structure of each packet (frame) will be described with reference to FIG. 3, not only the above-mentioned region for setting audio data of each channel but also a region for storing control data are set in each packet. Using the region for storing control data, it is possible to transmit and receive (i.e., communicate) a variety of control data between nodes.

A console 106 is connected to the node B102. For example, when data destined for the console 106 is included in control data received by the node B102, the control data is transmitted from the node B102 to the console 106 as shown by an arrow 116. When the console 106 has control data that is to be transmitted to a node, the console 106 transmits the control data to the node B102 as shown by an arrow 117 and the node B102 sets control data of a packet circulating on the network in a corresponding region and transmits it to a destination node. A detailed method for transmitting and receiving control data will be described with reference to FIG. 3.

FIG. 1b illustrates an example in which nodes are connected in cascade through double connection lines. In this example, a packet is carried in a loop using forward lines through which the packet flows in a forward direction and backward lines through which the packet flows in a backward direction. Reference numeral "141" denotes a master node A and "142" to "144" denote slave nodes B, C, and D. The master node A141 and the slave node B142 are connected through a forward signal line 151 and a backward signal line 156. Similarly, the node B142 and the node C143 are connected through connection lines 152 and 155 and the node C143 and the node D144 are connected through connection lines 153 and 154. Directions in which packets flow are denoted by arrows 161 to 166. The example of FIG. 1b is basically similar to that of FIG. 1a in that bit data of a packet output from the master node A141 circulates through the nodes and returns to the node A141 as shown by the arrows 161 to 166. However, in the example of FIG. 1b, the packet passes through the nodes C and B in the course of returning to the master node A after reaching the end slave node D144. Writing and reading of audio data and control data of each of the nodes A to D is performed on a forward path. On the returning path along the nodes A to D, data loading or writing is not performed so that data only passes through the nodes. In the example of FIG. 1b, the end node A is a master node. However, also when the intermediate node B or C is set as a master node, the paths of the arrows 161, 162, and 163 are referred to as "forward paths", the paths of the arrows 164, 165, and 166 are referred to as "backward paths", and data loading or writing is performed on the forward paths (on which packets travel in the right direction in FIG. 1b). In this case, a slave node to the left of the master node, which is located in the middle of this figure, first receives a packet on a backward path and afterwards receives a packet on a forward path but data loading or writing is performed on the forward path. In addition, data loading or writing may be performed on the backward path instead of only passing data through each node on the backward path.

In the case of the ring connection, end ones of the plurality of nodes must be connected to each other after the plurality of nodes are connected sequentially. On the other hand, in the case of the cascade connection, it is only necessary to connect the plurality of nodes sequentially using the double connection lines. Thus, devices of the cascade connection may have a simpler structure.

FIGS. 2a-2f illustrate the flow of bit data in a packet in an audio network system of this embodiment. In the following description of this example, it is assumed that a master node A and slave nodes B and C are connected through forward and backward paths as shown in FIG. 1b.

Figure 2A:
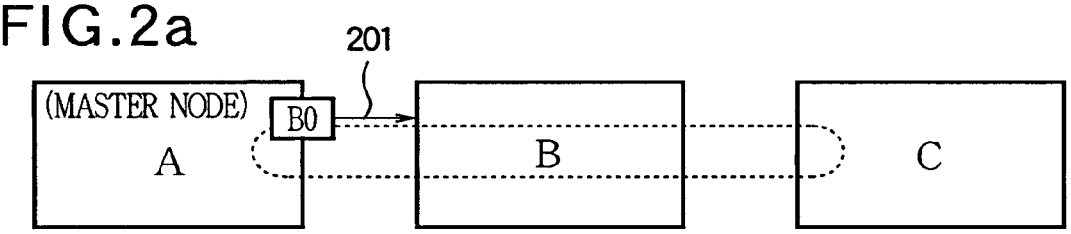
FIGS. 2a-2f illustrate the flow of bit data in a packet in an audio network system of this embodiment.
Figure 2B:
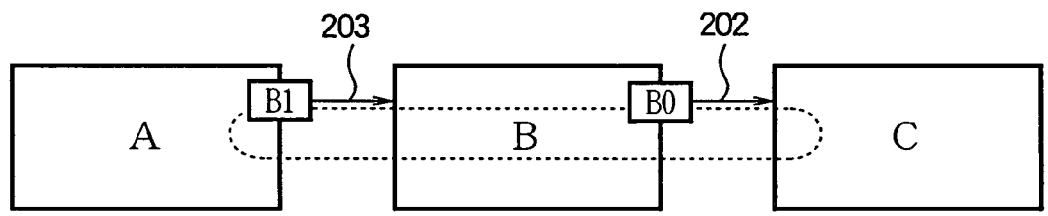
Figure 2C:
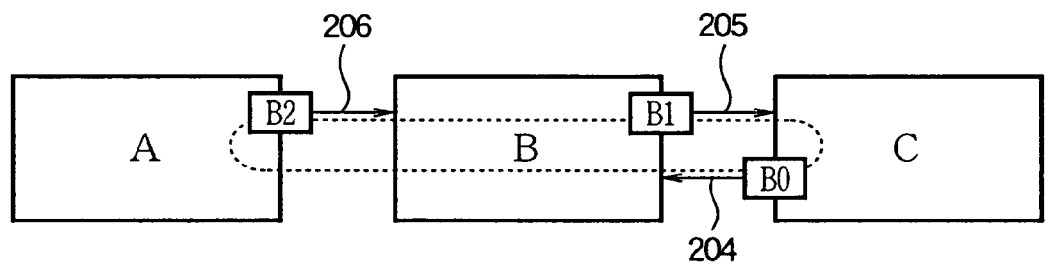
Figure 2D:
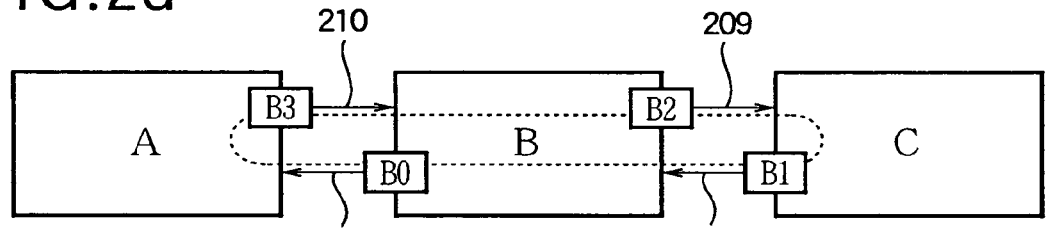
Figure 2E:
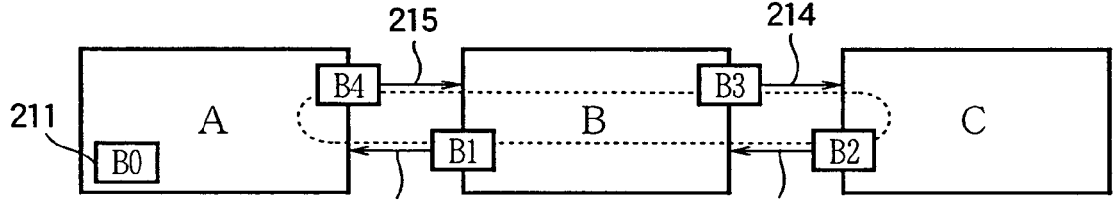
Figure 2F:
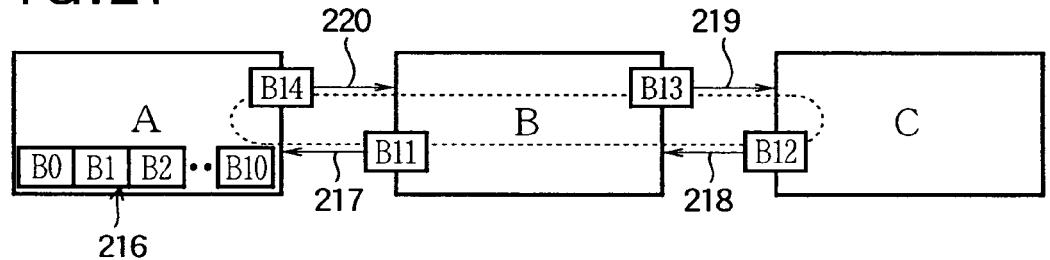

At the start time of one sampling period, the master node A starts transmitting bit data of one packet. FIG. 2a shows a state in which the master node A transmits a head bit B0 of the packet to the downstream node B as shown by an arrow 201. Thereafter, the master node A transmits bits of data of the packet subsequent to the head bit B0 sequentially bit by bit in synchronization with a network clock output from the master node A. FIG. 2b shows a state in which the master node A transmits a 51st bit B1 of the packet to the node B as shown by an arrow 203 at the moment when a time corresponding to 50 bits has passed. At this time, the node B transmits the received head bit B0 to the next node C as shown by an arrow 202. Of course, intermediate bits are also transmitted although attention is focused only on every fiftieth bit in the drawings. Similarly, the master node A successively outputs data of bits represented by a 101st bit B2, a 151st bit B3, and a 201st bit B4 as shown in FIGS. 2c to 2e and the output bit data returns to the master node A after passing through the nodes. FIG. 2e shows a state in which the head bit B0 of the packet, which has returned to the master node A, is stored in a buffer as denoted by "211". FIG. 2f shows a state in which data of 500 bits B0-B10, which has successively returned to the master node A, are stored in a buffer as denoted by "216". The master node A waits until the sampling period is terminated after transmitting all bits of the packet in the above manner and then starts transmitting a packet of the next sampling period as shown in FIG. 2a. However, the master node A has not yet received up to the last bit of the packet of the sampling period at the moment of FIG. 2f.

When bit data of one packet circulates once in one sampling period as described above, each node loads bit data of a reception channel that is to be loaded at the node and writes bit data of a transmission channel that is to be written at the node. For example, if bit data received by the node B is data of a sample of a reception channel that has been set to be loaded at the node B, the node B loads the bit data into a buffer of the node B. In addition, if the received bit data is data of a sample of a transmission channel that has been set to be transmitted from the node B, the bit data is overwritten with data to be written. After this process is performed, the bit data is transmitted to the next node C. The same process is performed at the next node. Loading and writing of control data is performed in the same manner. As described above, data loading or writing at each node in this embodiment is performed on forward paths (along nodes A→B→C in FIG. 2) and data only passes through the nodes on backward paths (along nodes C→B→A).

Figure 3:
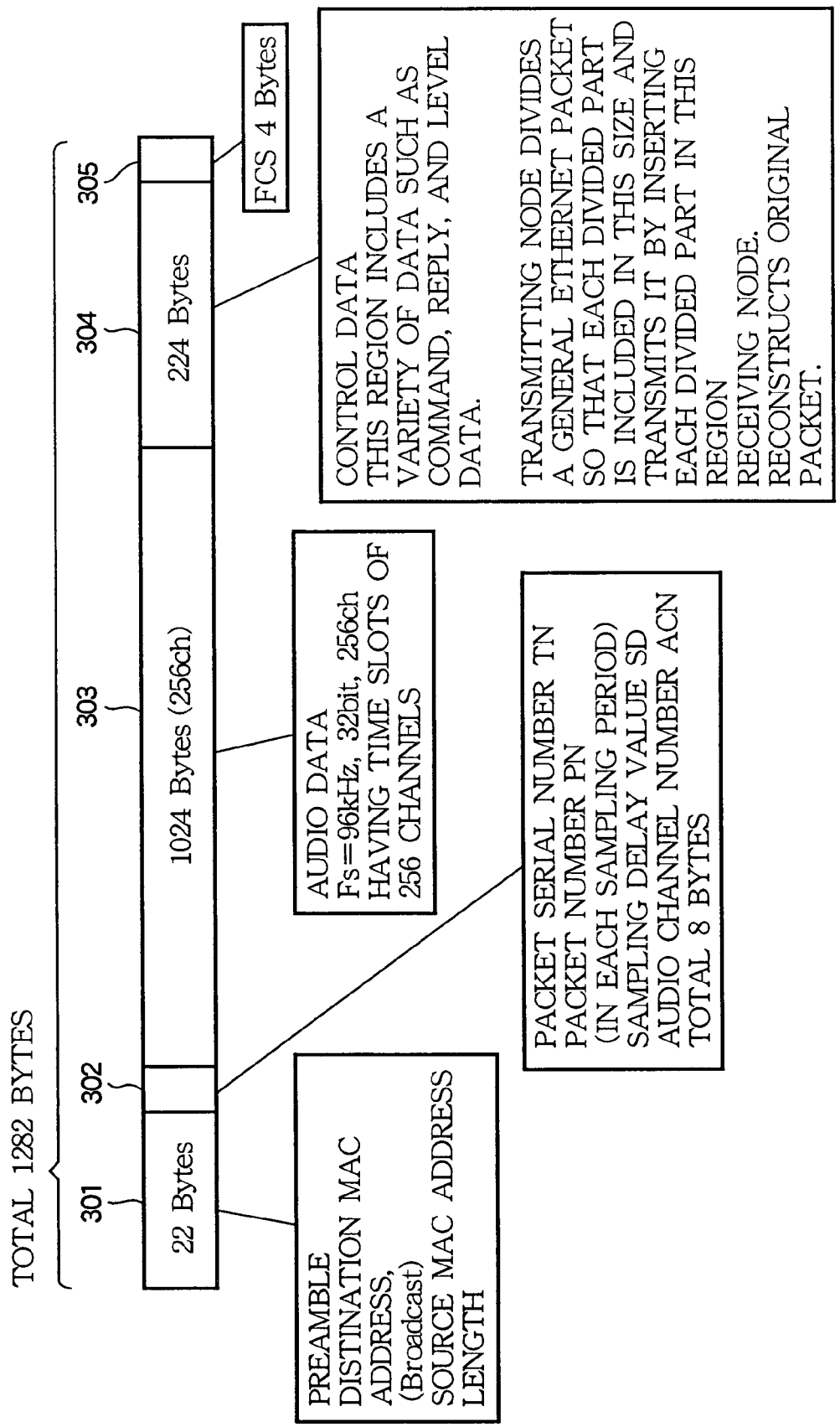
FIG. 3 illustrates a frame data structure of one packet.

FIG. 3 illustrates a frame data structure of one packet that circulates through all connected nodes in one sampling period in the audio network system of this embodiment. For example, the total number of bytes of the frame data of one packet is 1282.

Reference numeral "301" denotes a region in which a preamble, a destination MAC address, a source MAC address, and a data length are stored. The preamble is data used to establish synchronization at each node when the frame data is transmitted. Each node detects this preamble from data received from an upstream node, and detects, from the detected preamble, that the frame data of the packet has been initiated. A hexadecimal value "FF . . . FF" indicating broadcasting, which may be a MAC address of a next node receiving the packet according to the flow of the packet, is set in the destination MAC address and a MAC address of the master node, which may be a MAC address of a node that transmits the packet, is set in the source MAC address. Each of the nodes (including the consoles 106 and 145 in FIG. 1a or 1b) in this audio network system has a MAC address. The "length" indicates the total length of this frame data (for example, 1282 bytes).

Reference numeral "302" denotes an 8-byte region in which a packet serial number TN, a packet number PN in each sampling period, a sampling delay value SD, and an audio channel number ACN are stored. The packet serial number TN is a serial number assigned to a packet, which is incremented each time the master node starts transmitting a packet. When a plurality of packets circulate in one sampling period (which will be described in a modified example), the packet number PN in each sampling period of a packet is a serial number of the packet indicating the ordinal number of the packet in the sampling period. The packet number PN in each sampling period is not used in this embodiment since one packet circulates in one sampling period. The audio channel number ACN indicates the number of channels of an audio data storage region 303 which is described below.

Reference numeral "303" denotes a region in which audio data is stored. Here, the sampling frequency Fs is 96 kHz and one sample is divided into blocks that can store 256 channels of 32-bit data. Thus, the ACN is set to 256. The respective blocks of the 256 channels are regions in which sample data of the 1st, 2nd, . . . , 256th channels in the order from the head are set. Here, to ensure stable audio transmission, a band is always secured even for a channel that is not used for transmission between nodes. For example, even when writing is not performed for a block of a certain channel at any node in the network system, the master node does not remove the block of the channel. Accordingly, the audio channel number ACN has a constant value, which is equal to the maximum number of channels that can be transmitted. The master node may write a mute audio signal to the block of the channel that is not used.

Reference numeral "304" denotes a 224-byte region in which control data is stored. The control data includes a variety of data such as a command, a reply, and level data. For example, when a node becomes a transmitting node which desires to transmit some data to a receiving node, the following procedure is performed. First, since a token indicating the authority to transmit data is set at a specific position of the control data storage region 304, the node which desires to transmit control data obtains the token included in a packet that circulates through the nodes every sampling period. When a node obtains the token, the node gets the transmission authority and other nodes cannot obtain the token until the node releases the token. The node, which has obtained the token to have the transmission authority, creates a transmission data packet of the conventional Ethernet standard (in which a MAC address of the receiving node is set in a destination MAC address) including data which it desires to transmit and then divides and inserts the transmission data packet into the control data storage region 304 to transmit it separately in a plurality of divided packets having the format of FIG. 3. Each node, which has received the packet, loads data of the control data storage region 304. If the loaded data is divided data of the transmission data packet of the Ethernet standard, the node combines a plurality of such divided data received separately to reconstruct the transmission data packet of the Ethernet standard and determines whether or not its destination MAC address is the address of the node. If the destination MAC address is the address of the node, the node loads the transmission data packet. When the destination MAC address is not the address of the node, the node discards the transmission data packet. It is possible to transmit and receive control data between nodes by carrying it in the circulating packets of FIG. 3 in the above manner.

The token may not always circulate. For example, the token may circulate through nodes connected in a ring once each time the packet circulates a predetermined number of times. When the audio network system starts up, the respective MAC addresses or connection positions of the nodes connected to the network (including the console 106 or 145 of FIG. 1a or 1b) are provided to all the nodes in its initialization process. Thus, it is possible to communicate control data between the nodes in the same manner as the general LAN. Alternatively, a console which performs overall control of the system may manage the token. For example, a region for storing a flag to request a token corresponding to each node is set in a control data region of a packet, and a token is requested from the console by setting the flag and, in response to the request, the console assigns a token to a node which has made the request. In this case, upon completing packet transmission, the node returns the token to the console.

Reference numeral "305" denotes an FCS field for error checking. In this embodiment, the FCS 305 is effective only for a pair of transmitting and receiving nodes since the packet of FIG. 3 is rewritten while circulating through each node as described above with reference to FIG. 1a or 1b. For example, the node A transmits frame data to the node B after setting an FCS of the frame data in its region 305 and the node B determines whether or not the frame data has been received normally by checking the FCS of the received frame data. When the frame data has been received normally, an audio sample read from the frame data is reproduced or control is performed based on control data read from the frame data and an FCS is also generated based on the frame data which has been subjected to writing of an audio sample or control data to be rewritten at the corresponding node and the frame data is then transmitted to the node B after setting the generated FCS in its region 305. When the frame data has been received abnormally, an audio sample or control data read from the frame data is discarded and the reproduced audio sample is muted and the frame data is transmitted to the node B after setting information indicating that an error has occurred in the reception by the corresponding node in its region 305 or in an immediately previous region.

Figure 4:
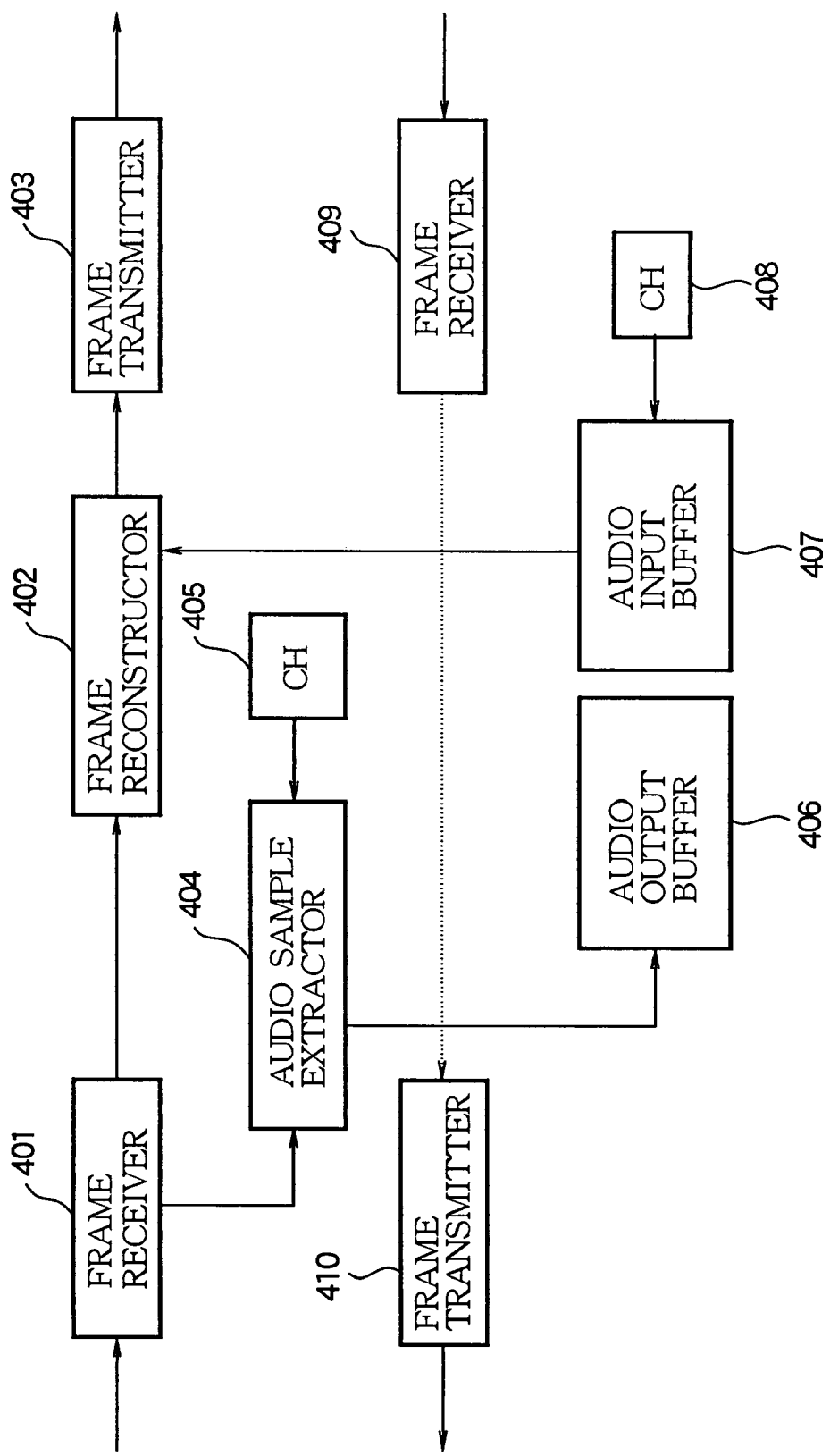
FIG. 4 illustrates the configuration of a frame data transmission/reception unit included in each node.

FIG. 4 illustrates the configuration of a frame data transmission/reception unit included in each node. The frame data transmission/reception unit includes a frame receiver 401, a frame reconstructor 402, a frame transmitter 403, an audio sample extractor 404, a channel register 405, an audio output buffer 406, an audio input buffer 407, a channel register 408, a frame receiver 409, and a frame transmitter 410.

A path from the frame receiver 401 to the frame transmitter 403 via the frame reconstructor 402 is a forward path of this node and a path from the frame receiver 409 to the frame transmitter 410 is a backward path of this node. If the node (for example, the node A of FIG. 1b) is not connected to any node which serves as both an output destination node of the frame transmitter 410 and an input source node of the frame receiver 401, the frame transmitter 410 is automatically connected to the frame receiver 401 so that data is directly passed from the frame transmitter 410 to the frame receiver 401. If the node (for example, the node D of FIG. 1b) is not connected to any node which serves as both an output destination node of the frame transmitter 403 and an input source node of the frame receiver 409, the frame transmitter 403 is automatically connected to the frame receiver 409 so that data is directly passed from the frame transmitter 403 to the frame receiver 409.

In FIG. 4, bit data transmitted from an upstream node is sequentially received by the frame receiver 401. The frame receiver 401 extracts a network clock from the received bit data and also detects a preamble part described above with reference to FIG. 3 and detects data in the range of audio data 303 based on the end of the preamble part. The audio sample extractor 404 extracts sample data of a time slot of each channel of the audio data 303. If the channel has been set in the channel register 405, the sample data is copied to the audio output buffer 406. The channel register 405 is a register in which a reception channel (or a plurality of reception channels) to be loaded at the corresponding node is stored.

On the other hand, bit data to be sequentially received by the frame receiver 401 is transmitted to the frame reconstructor 402. The frame reconstructor 402 includes a buffer of a predetermined number of bits (for example, a shift register of tens to hundreds of bits). While the received bit data flows through the buffer, the frame reconstructor 402 detects data of a time slot (block) of each channel based on the end of the preamble. If a channel of the time slot has been set in the channel register 408, the frame reconstructor 402 overwrites the time slot with sample data to be written to the channel stored in the audio input buffer 407. Although this buffer is provided to perform the data overwriting, the buffer also functions to compensate for the difference between a network clock of bit data received by the node and a network clock of bit data transmitted by the node. However, the buffer cannot be designed to be too large in size since the size of the buffer corresponds to a transfer delay at the node. The channel register 408 is a register in which a transmission channel (or a plurality of transmission channels) to be rewritten at this node is stored. The frame data reconstructed by the frame reconstructor 402 is transmitted to a downstream node via the frame transmitter 403.

On a backward path, data transmitted from a frame transmitter of the upstream node and received by the frame receiver 409 is passed to the frame transmitter 410 without alteration and is then transmitted to the downstream node.

The data transmission from the frame transmitter of the upstream node to the frame receiver 401 is performed based on a network clock generated by the frame transmitter of the upstream node and the data transmission from the frame transmitter 403 to the downstream node is performed based on a network clock generated by the frame transmitter 403. Accordingly, the reception operation of the frame receiver 401 and the transmission operation of the frame transmitter 403 are performed asynchronously. The same is true on the backward path.

In the above manner, a sample of a channel set for this node can be loaded into the audio output buffer 406 in this node. In addition, a sample of audio data input at this node can be set in the audio input buffer 407 and can be transmitted to another node by carrying it in a time slot of a set channel in frame data.

A sampling clock $C_s$ (word clock) used in the system will now be described. The nodes of the system are a variety of audio devices, each of which processes audio data in synchronization with a sampling clock $C_s$ generated by each device. If the frequency of a sampling clock $C_s$ of a transmitting audio device is different from that of a receiving audio device when audio data is transmitted from the transmitting audio device to the receiving audio device, the receiving audio device must convert its sampling frequency since it cannot handle the audio data without conversion. However, the sampling frequency conversion may reduce the quality of the audio data. Thus, in this system, sampling clocks $C_s$ generated by the audio devices are synchronized in phase with the timing of reception of a packet from the master node at intervals of the sampling period (i.e., the timing of generation of a sampling clock by the master node), thereby approximately matching the sampling clocks of the audio devices. This makes it possible to transmit and receive audio data between audio devices without conversion of the sampling frequency. More specifically, the master node starts transmitting a packet at the timing of generation of its sampling clock $C_s$. Upon receiving the packet, each slave detects a preamble part of the packet through the frame receiver 401 and generates its sampling clock $C_s$ through a phase lock loop (PLL) oscillator based on the timing of termination of the preamble part. Since the packet of FIG. 3 circulates through all nodes of the system every sampling period, each node can generate a synchronized sampling clock. Although processes performed at each node causes a delay and cables between the nodes also cause a delay, these delays are practically negligible. Taking into consideration these delays, the timing of each node may be corrected to generate a more accurately synchronized clock.

Figure 5:
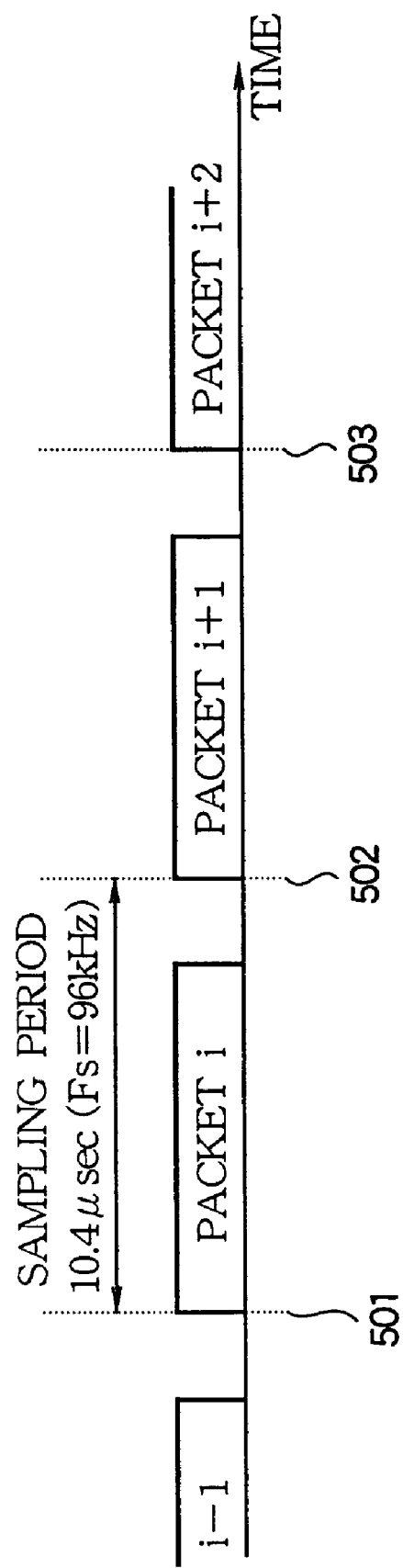
FIG. 5 illustrates a timing diagram of packets at each transmission line.

FIG. 5 illustrates a timing diagram of packets at each transmission line. For example, this may be considered as a packet timing diagram at the transmission line 111 of FIG. 1*b* on which packets are delivered from the master node A101 to the downstream node B102. Here, it is assumed that the sampling frequency $F_s$ is 96 kHz. The time length of one sampling period is 10.4 μsec. Reference numerals "501", "502", and "503" denote the start times of sampling periods. The protocol for transmission lines between nodes uses the transmission medium or physical layer of the Ethernet standard as described above. Here, it is assumed that data transmission is performed between nodes at a speed of 1 Gbps of the 1000BASE-T Ethernet standard. At this speed, it takes 1 nanosecond to transmit 1 bit so that the time length of frame data of one packet described above with reference to FIG. 3 is 10.26 μsec (=1 nsec×8 bits×1282 bytes). This guarantees that one packet will be included in the time interval of one sampling period. Accordingly, as shown in FIG. 5, transmission of bit data of a packet "i" is initiated at a start timing 501 of a sampling period and the transmission of the packet "i" is terminated before a start timing 502 of a next sampling period is reached. The same is true for packets "i+1" and "i+2".

Figure 6:
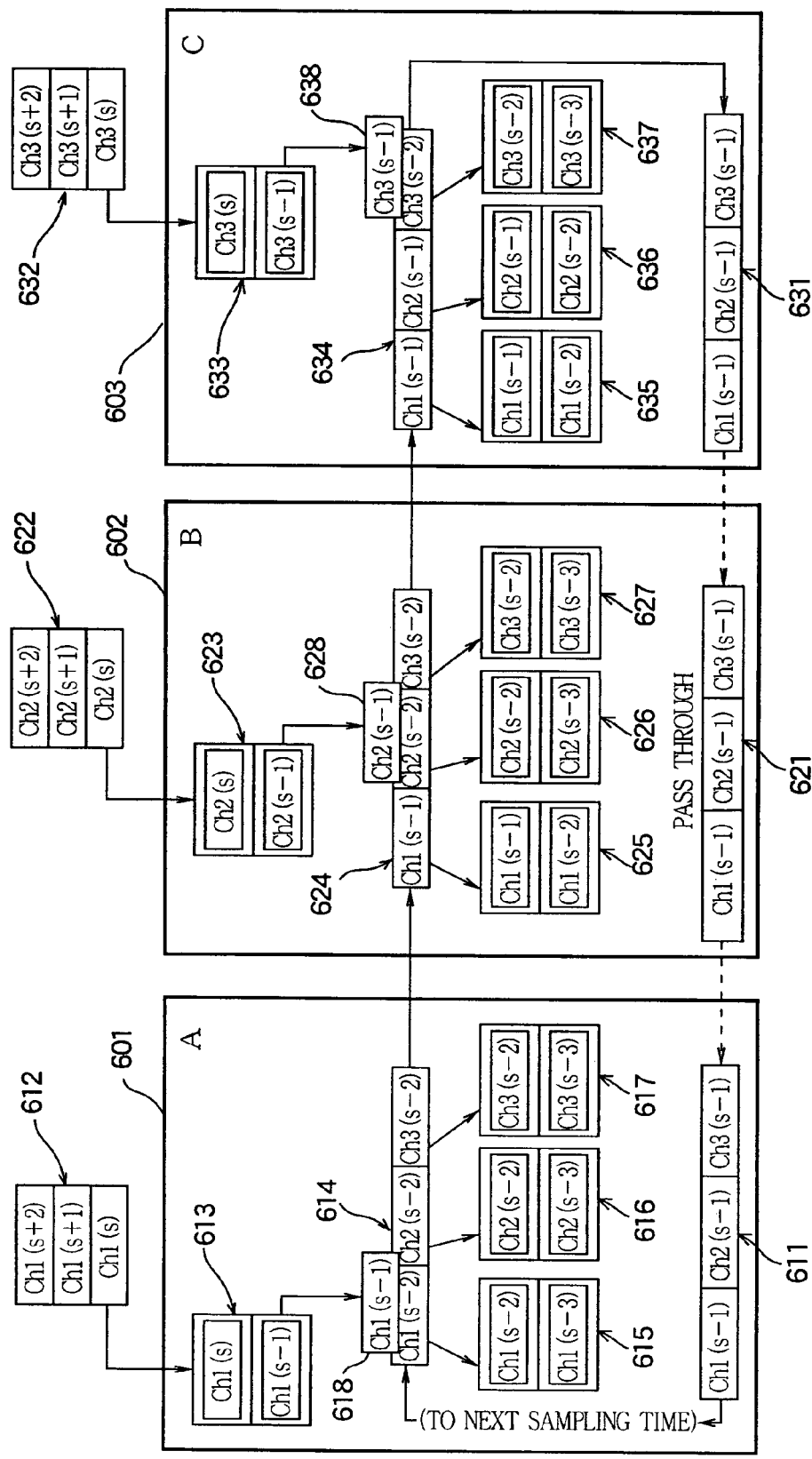
FIG. 6 is an image diagram illustrating the flow of transmission of audio samples in this embodiment.

FIG. 6 is an image diagram illustrating the flow of transmission of audio samples in this embodiment. Although it is illustrated in FIG. 6 that one packet is sequentially delivered from each node to an adjacent node in FIG. 6, it is to be noted that an actual packet spreads over a plurality of nodes as shown in FIG. 2. Here, it is assumed that the node A601 is a master node and the nodes B602 and C603 are slave nodes and the nodes are connected through forward and backward paths as described above with reference to FIG. 1*b*. First, it is assumed that samples Ch1(*s*−2), Ch2(*s*−2), and Ch3(*s*−2) are stored in a frame 614 that has been prepared as a packet to be transmitted by the master node at a certain time (t). The time resolution of the time (t) corresponds to the sampling period and sample data at the current time (t) of Ch* is denoted by Ch*(s). Accordingly, "Ch*(s−3)" denotes data of 3 samples ago from the current time of Ch*. Data (s−2) of 2 samples ago of channels Ch1, Ch2, and Ch3 that has returned to the node A is shown as being included in the frame "611".

It is assumed that sample data Ch1(*s*), Ch2(*s*), and Ch3(*s*) of channels Ch1, Ch2, and Ch3 are input to the nodes 601, 602, and 603 at time (t). "612", "622", and "632" denote buffers in which sample data of the corresponding channels to be input to the nodes A, B, and C are stored. "613", "623", and "633" denote buffers (corresponding to the audio input buffer 407 of FIG. 4) provided respectively in the nodes A, B, and C. These buffers 613, 623, and 633 each have a capacity capable of storing 2 samples, and currently input sample data Ch1(s), Ch2(s), and Ch3(s) is written to the buffers 613, 623, and 633.

The master node A creates a frame 614 of the current time (t) based on the frame 611 that has circulated and returned to the master node A in the immediately previous sampling period corresponding to the time (t−1) at which sampling data Ch1(s−1), Ch2(s−1), and Ch3(s−1) is stored in the frame 611. The master node overwrites sample data Ch1(s−2) of the channel Ch1, which has been set to be written at this node A among the sample data Ch1(s−2), Ch2(s−2), and Ch3(s−2) stored in the created frame 614, with a next sample Ch1(s−1) stored in the buffer 613 (618). Samples of the other channels stored in the frame 611 which has returned to the node A are set as they were. The node A transmits the frame data of the packet created in this manner to the node B at the start timing of a sampling period of the current time (t). Here, let us assume that it has been set that, at the node A, respective sample data of the channels Ch1, Ch2, and Ch3 are to be loaded from the circulating packet. Thus, at the node A, sample data Ch1(s−2), Ch2(s−2), and Ch3(s−2) of the returned frame 614 is loaded into the buffers 615, 616, and 617 of the respective channels. These buffers 615, 616, and 617 correspond to the audio output buffer 406 of FIG. 4. Each of the respective buffers 615, 616, and 617 of the channels is constructed to have two regions, one storing current sample data loaded from the packet received at the time (t) and the other storing sample data of one cycle ago. In FIG. 6, sample data of a channel written to a packet by a node is illustrated as being loaded by the same node. However, this illustration is intended only to show an example in which sample data of a plurality of channels is loaded. Actually, the sample data is not loaded by the same node since loading by the same node is a waste of resources.

The node B overwrites sample data Ch2(s−2) of the channel Ch2, which has been set to be written at this node B among the sample data Ch1(s−1), Ch2(s−2), and Ch3(s−2) stored in the frame 624 transmitted from the node A, with a next sample Ch2(s−1) stored in a buffer 623 (628). Samples of the other channels are set as they were. The node B transmits the frame data of the packet created in this manner to the node C. Here, it is assumed that respective sample data of the channels Ch1, Ch2, and Ch3 has been set to be loaded from the circulating packet at the node B. Thus, at the node B, sample data Ch1(s−1), Ch2(s−2), and Ch3(s−2) of the frame 624 is loaded into buffers 625, 626, and 627 of the respective channels. The buffers 625, 626, and 627 have the same configuration as those of the node A.

The node C overwrites sample data Ch3(s−2) of the channel Ch3, which has been set to be written at this node C among the sample data Ch1(s−1), Ch2(s−1), and Ch3(s−2) stored in the frame 634 transmitted from the node B, with a next sample Ch3(s−1) stored in a buffer 633 (638). Samples of the other channels are set as they were. The node C turns the frame data of the packet created in this manner around to a backward path. Here, it is assumed that respective sample data of the channels Ch1, Ch2, and Ch3 has been set to be loaded from the circulating packet at the node C. Thus, at the node C, sample data Ch1(s−1), Ch2(s−1), and Ch3(s−2) of the frame 634 is loaded into buffers 635, 636, and 637 of the respective channels. The buffers 635, 636, and 637 have the same configuration as those of the node A. The packet which has turned around to the backward path only passes through the nodes as denoted by "631", "621", and "611", thereby returning to the master node A. In the same manner, the master node creates a packet to be transmitted in a next sampling period and transmits it at the start timing of the next sampling period.

In this embodiment, only the master node A can obtain audio sample data from each node without any sample lag as can be seen from the states of the sample loading buffers of each node. On the other hand, at the node B or C, a sample lag occurs when sample data is loaded from the packet since the node B or C has a channel to be rewritten with a next sample at an upstream node. To correct such a sample lag, each node may contain information regarding all wiring states of the network and information regarding which node stores each channel and may output sample data stored at a previous stage by delaying it by one sample as seen from the node.

FIG. 7a illustrates a hardware process when a preamble is detected at the frame receiver 401 (see FIG. 4) of a slave node to cause a "packet reception occurrence event". Although processes of FIGS. 7 to 9 seem to be software processes since they are expressed by flow charts, the processes of FIGS. 7 to 9 are actually hardware processes that are performed by a logic circuit or a digital signal processor (DSP). At step 701, the slave node enables both a process (receiving process) for receiving bit data of a packet transmitted from an upstream node and collecting such bit data corresponding to one byte to activate a reception event process of FIG. 7b and a process (transmitting process) for starting transmitting data in a buffer of its frame reconstructor 402 to a downstream node at the timing when up to a certain amount of data has been stored in the buffer of the frame reconstructor 402. Here, the slave node also provides a timing signal to a PLL oscillator (Fs generator), which is generating a sampling clock Cs, at the timing when its preamble part is terminated, thereby controlling the frequency of the sampling clock.

FIG. 7b illustrates a hardware process that a frame data transmission/reception unit of a slave node performs when receiving bit data corresponding to one byte after starting the receiving process. Although the received data is handled on a byte basis in this example, it may be handled on a bit or word basis. At step 702, the received 1-byte data is loaded. At step 703, it is determined which time slot corresponds to the received 1-byte data. If the received 1-byte data is header data ("301" and "302" in FIG. 3), the 1-byte data is written to the buffer of the frame reconstructor 402 and a process corresponding to the received header data is performed at step 704. Here, through the transmitting process, the data, which was stored in the buffer of the frame reconstructor 402 through the reception event process, is automatically transmitted to a next node by the frame transmitter 403 at the timing when data of up to a certain amount (tens to hundreds of bits) remains in the buffer. Accordingly, the "transmitting" process in this reception event process is a process in which data to be transmitted is written to the buffer. The transmission from the frame transmitter 403 is performed according to a network clock generated based on an operating clock of the frame data transmission/reception unit. This network clock for transmission is not synchronized with a network clock for reception extracted by the frame receiver 401.

When the received 1-byte data is audio data corresponding to a reception channel (channel 408 in FIG. 8) of the node, at step 705, one byte stored in an audio transmission buffer (the audio input buffer 407 in FIG. 4) is extracted and overwritten into a position corresponding to the received 1-byte data in the buffer of the frame reconstructor 402 and it is then transmitted to a next node from the frame transmitter 403. When the received 1-byte data is audio data of a reception channel (channel 405 in FIG. 4) of the node, at step 706, the 1-byte data is written to a corresponding position in the buffer of the frame reconstructor 402 and is then transmitted to the next node through the frame transmitter 403 while being loaded into the audio reception buffer (the audio output buffer 406 in FIG. 4). If the received 1-byte data is other data, for example, data such as audio data of a channel that is neither to be transmitted nor received, at step 707, the 1-byte data is written, without alteration, to the buffer of the frame reconstructor 402 and is then transmitted to the next node.

If the received 1-byte data is data in the control data storage region ("304" in FIG. 3), it is determined, at step 708, whether or not the node has the authority to transmit data. If the node has no transmission authority, at step 709, the 1-byte data is written to the buffer of the frame reconstructor 402 without alteration and is then transmitted to the next node. At step 709, the 1-byte data is also loaded as partial data and a process corresponding to the partial data is performed. For example, if the partial data is divided data of a token and the node desires to get the transmission authority, the node combines a plurality of such divided data received separately to reconstruct the token and thus to get the transmission authority and deletes the token written to the buffer to prevent it from being transmitted to the next node. If the divided data is data produced by dividing a transmission data packet for transmitting control data (described above with reference to FIG. 3), the node combines a plurality of such divided data received separately to reconstruct the transmission data packet. If its destination MAC address is the address of the node, the node loads the transmission data packet and extracts the control data included in the transmission data packet and then performs a process corresponding to the control data. When the node has got the transmission authority at step 708, the node overwrites, at step 710, 1-byte partial data in a D transmission buffer, in which data to be transmitted is stored, into a position corresponding to the received 1-byte data in the buffer of the frame reconstructor 402 and then transmits it to the next node. Upon completing the transmission of all data stored in the D transmission buffer, the node creates a token and writes it to a position corresponding to the control data storage region in the buffer and then transmits it to the next node, thereby releasing the transmission authority. If the data stored in the D transmission buffer is greater than 224 bytes corresponding to the size of the control data storage region, the data cannot be included in a control data storage region of one packet and therefore it is divided into a plurality of partial data, each smaller than 224 bytes, and is then transmitted by including it in control data storage regions of the respective packets of a plurality of consecutive sampling periods.

After steps 704-707, 709, and 710, the node determines whether or not the 1-byte data received at step 711 is the last byte. If the received 1-byte data is the last, the node performs a process for terminating the transmission/reception at step 712. The transmission/reception termination process includes a series of processes associated with the above-mentioned FCS checking and a process for terminating the transmission upon completing the transmission of the last byte data.

FIG. 8a illustrates a hardware process when a preamble is detected at the frame receiver 401 (see FIG. 4) of a master node to cause a "packet reception occurrence event". At step 801, the master node performs a reception start process and activates a process (receiving process) for receiving bit data of a packet transmitted from a plurality of slave nodes of the system and collecting such bit data corresponding to one byte to activate a reception event process of FIG. 8b. This starts a process for receiving frame data of the packet. Since sampling clocks of other nodes are generated based on a sampling clock generated at the master node, it is not necessary to control the frequency of the sampling clock $C_s$ at step 801.

FIG. 8b illustrates a hardware process that a frame data transmission/reception unit of the master node performs when receiving bit data corresponding to one byte after starting the receiving process. At step 802, the received 1-byte data is loaded. At step 803, it is determined which time slot corresponds to the received 1-byte data. Steps 804-810 are similar to steps 704-710 of FIG. 7b, respectively. However, while, at steps 704-707, 709, and 710, the slave node automatically starts the transmission to the next node at the timing when data of up to a certain amount (tens to hundreds of bits) remains in the buffer, the master node does not automatically start the transmission according to the amount of data in the buffer and starts the transmission after waiting until one sampling period is terminated (i.e., at the start timing of the next sampling period). Therefore, steps 804-807, 809, and 810 are expressed by words "save 1-byte data in buffer" rather than "write 1-byte data to buffer of frame reconstructor 402" in FIG. 7b. In addition, although the received frame data is frame data of the current sampling period, the next data to be transmitted by the master node is frame data of the next sampling period. Therefore, the master node performs the writing to the buffer while converting the received frame data into frame data of the next sampling period. Steps 811 and 812 are similar to steps 711 and 712 of FIG. 7b. However, at step 812, the master node performs only the reception termination process since the transmission has not been initiated.

FIG. 8c illustrates how to use a buffer (frame data queue buffers) included in the frame reconstructor 402 of the master node. Since buffers "822" and "823" are used for a modified example that will be described later, we here focus only on a queue buffer A821. The queue buffer A821 has a length capable of storing one frame data of FIG. 3. Frame data, which has returned to the master node after circulating through the nodes in a sampling period, is converted into frame data of the next sampling period and the converted frame data is stored in the queue buffer A821. This frame data is overwritten in advance with sample or control data, which is to be overwritten into the frame data, through the process of FIG. 8b. Accordingly, when the start time of the next sampling period is reached, a bit sequence of the frame data is extracted from the queue buffer A821 using the extract pointer 825, starting from the head of the queue buffer A821 and the extracted bit sequence of the frame is sequentially transmitted to the next node. Along with the data extraction, the extract pointer 825 advances as shown by an arrow "824" and, if all frame data is extracted, then the extract pointer 825 is initialized to point to the head of the queue buffer A821.

On the other hand, a bit sequence of frame data that has circulated through nodes and returned to the master node in a certain sampling period is converted into frame data of the next sampling period and is sequentially saved in the queue buffer A821. This saving is performed by the process of FIG. 8b. Specifically, the saving is performed by repeating a process of writing data to a position indicated by a save pointer 826 and then advancing the save pointer 826 as shown by an arrow 824. When all the bit sequence of the returned frame data has been saved in the queue buffer A821, the save pointer 826 is initialized to point to the head of the buffer A821.

When the master node transmits one packet to circulate through a plurality of nodes every sampling period, the head part of frame data, after the master node extracts the frame data from the queue buffer A821 and starts transmitting the frame data to the next node, returns to the master node before the master node completes the transmission of the frame data. This is the case where frame data returns to the master node after circulating through nodes which are not so many and each of which completes its processing quickly. When the number of nodes is great, the head of frame data may return to the master node after the master node completes transmission of the frame data. In this case, the extract pointer 825 seems to precede the save pointer 826. In addition, before frame data returned to the master node is completely saved in the queue buffer A821, the start time of the next sampling period may be reached to start extracting and transmitting data from the queue buffer A821. In this case, the save pointer 826 seems to precede the extract pointer 825.

Figure 9A:
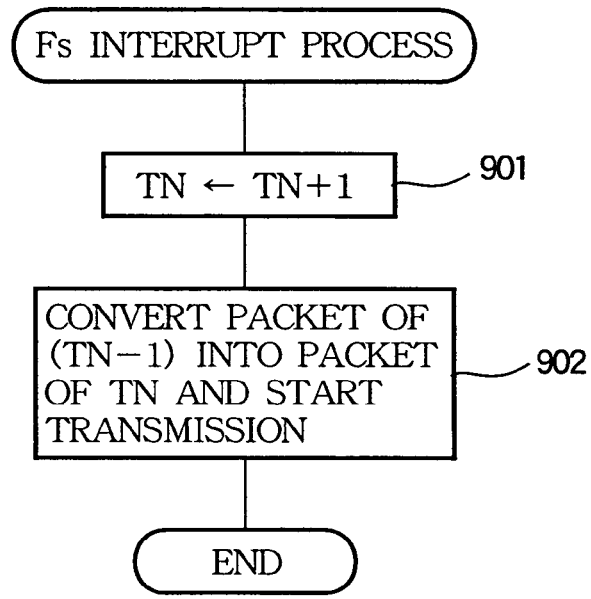
FIGS. 9a and 9b are flow charts of a sampling clock interrupt process and a 1-byte transmission event process in the master node.

FIG. 9a illustrates a sampling clock interrupt process in the master node. The master node performs this process according to an interrupt that is generated every sampling period. At step 901, the master node increments the value of a packet serial number TN. At step 902, the master node extracts frame data of a packet whose packet serial number is TN−1 from the queue buffer A821 of FIG. 8c and rewrites the packet serial number with TN and then starts transmitting the frame data to the next node.

Figure 9B:
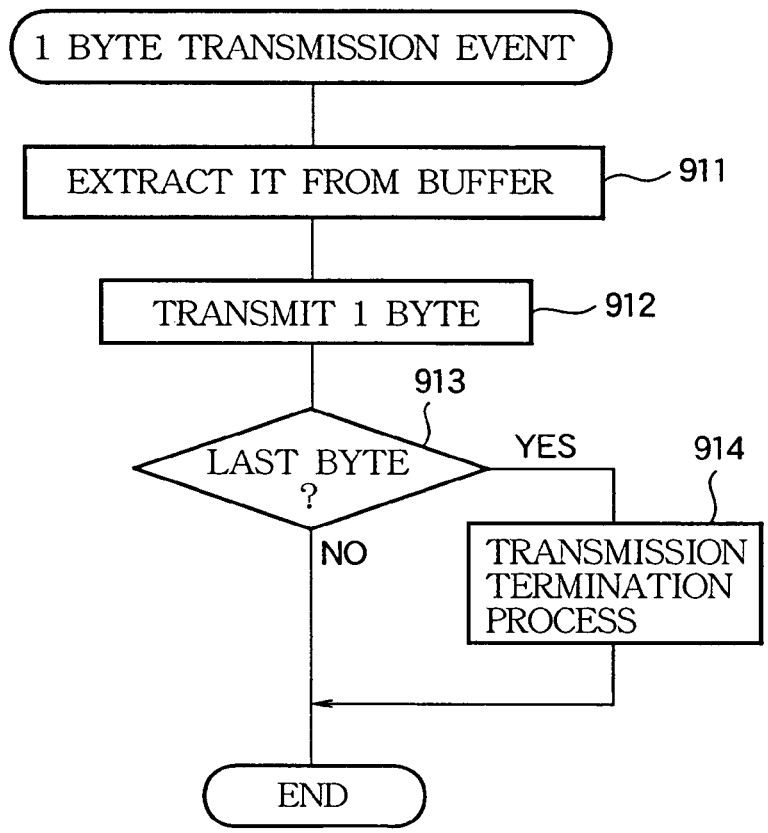

FIG. 9b illustrates a 1-byte transmission event process in the master node. The master node repeats this process until the transmission of frame data of the queue buffer A821 is terminated after starting the transmission at step 902. First, at step 911, the master node extracts 1-byte data from a position of the queue buffer A821 pointed to by the extract pointer 826 and advances the pointer 826. At step 912, the master node transmits the 1-byte data to the next node. At step 913, the master node determines whether or not the 1-byte data is the last byte and performs a process for terminating the transmission at step 914 if it is the last byte.

Although sample data or control data is overwritten when a 1-byte reception event has occurred as shown in FIG. 7b or 8b in the above embodiment, it may be overwritten when a 1-byte transmission event has occurred.

Although the above embodiment has been described with reference to an example in which one packet circulates in one sampling period as shown in FIG. 5, the present invention may also be applied to a modified example in which a plurality of packets circulates in one sampling period. For example, if communication is performed between nodes according to the 10 Gbit Ethernet standard rather than the 1000BASE-T Ethernet standard, about 8 packets can circulate in one sampling period. In this case, the following are required.

(1) As the queue buffer described above with reference to FIG. 8c, 8 queue buffers A821 to H828 are provided and sequentially used to store circulating frame data of 8 packets. At the start time of one sampling period, the master node consecutively transmits and circulates 8 packets and waits until the start time of the next sampling period is reached after completing the transmission of the 8 packets. When the start time of the next sampling period is reached, the master node starts transmitting next 8 packets. Packets in one sampling period are assigned the respective packet numbers PN in each sampling period, which indicate the respective ordinal numbers of the packets as described above with reference to "302" in FIG. 3. That is, in this example, the packet numbers PN have values of 1-8.

(2) Each slave node generates a sampling clock in synchronization with the start time of a packet of PN=1 (i.e., the first packet of one sampling period).

(3) In the interrupt process at step 902 of FIG. 9a, a packet having a packet serial number TN is created from frame data of a packet having a packet serial number of "TN−8", which is a packet of 8 packets ago from the packet with "TN".

In the cascade connection in the above embodiment, the master node may be an intermediate node rather than an end node of the cascade connection. For example, if the node B of FIG. 1b is a master node, the node B first transmits a packet of FIG. 3 to the node C every sampling period. The node B then transmits the packet, which has returned to the node B after sequentially passing through the nodes in the order of node B→node C→node D→node C→node B, to the node A without alteration of the packet and creates a packet of the next sampling period based on the packet which has returned to the node B after passing through the nodes in the order of node B→node A→node B.

Although a packet format according to the Ethernet standard is used in the above embodiment, a packet format according to a standard other than the Ethernet standard may also be used. For control signal transmission, an IP address may be given to each node.

In the case of the cascade connection, each slave node may perform a series of processes such as header processing, audio transmission/reception, and control data transmission/reception on a packet returned from a downstream node rather than a packet received from an upstream node.

In the above described embodiments, the master node operates each sampling period to generate new frame data of the current sampling period based on previous frame data, which has been generated one sampling period before the current sampling period and fed to the network, and which returns to the master node at the time of generating the new frame data after circulating through the slave nodes. Alternatively, the master node may generate the new frame data based on a frame data before the previous data, which has been generated two or more sampling periods before the current sampling period, and which have returned to the master node at the time of generating the new frame data. In this case, the previous sampling data generated two or more sampling periods ago can be received completely from the top to end thereof by the master node at the time when the new frame data is to be generated. Therefore, the master node can perform error check of the received frame data based on FCS of the received frame data before generating the new frame data. The master node generates the new frame data based on the received frame data only when no error is detected from the received frame data. By such a manner, it is possible to reduce or prevent trouble which would be caused by frame transfer error.

The invention claimed is:

1. An audio network system that comprises a plurality of nodes and that allows audio data to be transferred between any two nodes among the plurality of nodes,
   wherein the plurality of nodes are connected to one another to create a one-way loop passing through each of the plurality of nodes in the system so as to allow transmission of the audio data through the loop in one direction from upstream to downstream in the loop,
   wherein one of the plurality of nodes is set up as a master node at a most upstream node in the loop and the other nodes are set up as slave nodes,
   wherein the master node periodically transmits a packet of frame data containing the audio data every sampling period in the loop in the direction, the packet transmitted from the master node in each sampling period circulating through the plurality of nodes to return to the master node along the loop within one or more sampling periods,
   wherein the packet has a specific data length such that a time length of the packet is less than one sampling period in the loop and includes an audio data storage region made up of a predetermined number of blocks corresponding to a predetermined number of channels, such that each of the blocks stores audio data of the corresponding channel, wherein a transmitting node of each of the plurality of the nodes is set with a transmission channel and a receiving node of the plurality of nodes is set with a reception channel, wherein each of the slave nodes receives, every sampling period, the packet from an upstream node of the slave node, and transmits the received packet to a downstream node after a specific time has passed from the time when the slave node starts receiving a head of the packet, meanwhile the slave node processes the audio data storage region of the packet on a block-by-block basis, and if the slave node is a receiving node, the block of the packet corresponds to a transmission channel set to the slave node, and the slave node overwrites the block with audio data, and if the slave node is a transmitting node and the block of the packet corresponds to a reception channel set to the slave node, the slave node acquires audio data from the received block, wherein the master node receives, every sampling period, a packet that has returned from a slave node at the most downstream node in the loop, the master node constructs a next packet or a packet after the next packet to be transmitted in a next sampling period based on the received packet and transmits the constructed packet when the next sampling period starts, meanwhile the master node processes the audio data storage region of the packet on the block-by-block basis, and if the block of the packet corresponds to a transmission channel set to the master node, the master node overwrites the block with audio data, and if the master node is a receiving node and the block of the packet corresponds to a reception channel set to the master node, the master node acquires audio data from the block, wherein the constructed packet contains the same audio data as the audio data contained in the packet based on which the constructed packet is constructed by the master node, and wherein one transmission channel is set to only one node in the audio network system so that the audio data written into a block of a packet by the one node is not overwritten by another node during the course of circulating the audio data in the loop, and any node in the audio network system can acquire the audio data.

2. The audio network system according to claim 1, wherein the packet includes a control data storage region in addition to the audio data storage region so that the control data storage region of the packet is used to allow control data to be transferred between any two of the plurality of nodes.

3. The audio network system according to claim 1, wherein the packet has a data size and a data structure in accordance with an Ethernet standard, each of the plurality of the nodes comprises a transmitter and a receiver compliant with the Ethernet standard and a transmission cable compliant with the Ethernet standard that can be used to connect the plurality of nodes for the transmission of the packet.

4. The audio network system according to claim 1, wherein the plurality of nodes are connected to allow loop transmission of the packets, such that the plurality of nodes are connected in cascade by connecting each of the consecutive two of the plurality of nodes using two lines, one line for transmission of the packets in one direction, and the other line for transmission of the packets in the reverse direction, and each node at each end of the cascade reverses the direction of the transmission of the packet.

5. The audio network system according to claim 1, wherein the plurality of nodes are connected to allow loop transmission of the packets, such that the plurality of nodes are connected in cascade from a first node to a last node for transmission of the packets in one direction, and the last node is connected to the first node for returning the packets to the first node.

6. An audio network system that comprises a plurality of nodes and that allows audio data to be transferred between any two nodes among the plurality of nodes, wherein the plurality of nodes are connected to one another to create a one way loop passing through each of the plurality of nodes in the system so as to allow transmission of the audio data through the loop in one direction from upstream to downstream in the loop, wherein one of the plurality of nodes is set up as a master node at a most upstream node in the loop and the other nodes are set up as slave nodes, wherein the master node sequentially transmits a predetermined number of packets of frame data containing the audio data at every sampling period in the loop in the direction of the loop, the sequentially transmitted packets in each sampling period circulating through the plurality of the nodes and returning to the master node along the loop within one or more sampling periods, wherein the packet has a specific data length such that a time length of the packet is less than one sampling period in the loop and includes an audio data storage region made up of a predetermined number of blocks corresponding to a predetermined number of channels, such that each of the blocks stores audio data of the corresponding channel, wherein a transmitting node of each of the plurality of nodes is set with a transmission channel and a receiving node of the plurality of the nodes is set with a reception channel, wherein each of the slave nodes receives, every sampling period, each of the sequentially transmitted packets from an upstream node of the slave node and transmits the received packet to a downstream node after a specific time has passed from the time when the slave node starts receiving a head of the packet, meanwhile, the slave node processes the audio data storage region of the packet on a block-by-block basis, and if the slave node is a receiving node and a block of the packet corresponds to a transmission channel set to the slave node, the slave node overwrites-the block with audio data, and if the slave node is a transmitting node and the block of the packet corresponds to a reception channel set to the slave node, the slave node acquires audio data from the block, wherein the master node receives, every sampling period, -each of the predetermined number of the packets that has sequentially returned from a slave node at the most downstream node in the loop, the master node creates a predetermined number of packets to be transmitted in a next sampling period based on the received packets and transmits the predetermined number of the created packets when the next sampling period starts, meanwhile, the master node processes the audio data storage region of the packet on a block-by-block basis, and if the master node is a receiving node and the block of the packet corresponds to a transmission channel set to the master node, the master node overwrites the block with audio data, and if the master node is a receiving node and the block of the packet corresponds to a reception channel of the master node, the master node acquires audio data from the block, wherein the created packet contains the same audio data as the audio data contained in the packet based on which the created packet is created by the master node, and wherein one transmission channel is set to only one node in the audio network system so that the audio data written into a block of a packet by the one node is not overwritten by another node during the course of circulating the audio data in the loop, and any node in the audio network system can acquire the audio data.

7. The audio network system according to claim 6, wherein at least one of the predetermined number of the packets includes a control data storage region in addition to the audio data storage region so that the control data storage region of the packet is used to allow control data to be transferred between any two of the plurality of nodes.

8. The audio network system according to claim 6, wherein the packet has a data size and a data structure in accordance with an Ethernet standard, each of the plurality of nodes comprises a transmitter and a receiver compliant with the Ethernet standard, and a transmission cable compliant with the Ethernet standard can be used to connect the plurality of nodes for the transmission of the packet.

9. The audio network system according to claim 6, wherein the plurality of nodes are connected to allow loop transmission of the packets, such that the plurality of nodes are connected in cascade by connecting each consecutive two of the plurality of nodes using two lines, one line for transmission of the packets in one direction, and the other line for transmission of the packets in the reverse direction, and each node at the end of the cascade reverses the direction of the transmission of the packet.

10. The audio network system according to claim 6, wherein the plurality of nodes are connected to allow loop transmission of the packets, such that the plurality of nodes are connected in cascade from a first node to a last node for transmission of packets in one direction, and the last node is connected to the first node for returning the packets to the first node.

* * * * *